United States Patent Office

2,921,862
Patented Jan. 19, 1960

2,921,862

ACOUSTICAL COMPOSITION

Glenn Sucetti, Grass Valley, Calif.

No Drawing. Application August 14, 1957
Serial No. 678,039

4 Claims. (Cl. 106—88)

This invention relates to compositions which have useful acoustical properties. More particularly this invention relates to acoustical plaster intended to be applied to interior walls and ceilings of buildings to reduce noise and reverberation.

The compositions of the present invention have their largest field of application as plasters to be applied in the form of acoustical surface coatings over nonacoustical surfaces such as ordinary plaster or lightweight plaster. Nevertheless the compositions of the present invention have a broader field of utility. For example, they may be used as surface layers or coatings intended to function as heat insulators. Also, they may be used to construct articles such as mufflers and fireproofing barriers.

In the past acoustical plasters have been provided in which a lightweight porous mineral such as expanded vermiculite or expanded perlite serves as the aggregate and in which bentonite is employed as a binder.

In connection with acoustical plasters of this character (which are typified by U. S. Patent No. 1,927,102, granted September 19, 1933, to myself and Roland M. Kohr), there are certain desiderata which the manufacturer endeavors to satisfy, as follows:

The plaster mix, after water is added, should be capable of application by spraying, that is, by forcing it under pressure through a hose and a nozzle. The hose may have to be fairly long, for example, 50 feet. The pressure employed and the shearing and other forces resulting from passage through a long hose and a nozzle, frequently have an adverse effect on the qualities of the plaster, as described in more detail hereinafter.

The plaster when dried and finished must contain voids and cavities which function as sound absorbers. In the above-mentioned Patent No. 1,927,102 voids and cavities are provided by employing a porous, lightweight binder such as expanded vermiculite. Mixes of this character, however, suffer from the effects of pressure and shearing forces resulting from the spraying procedure. These forces tend to break down the voids and cavities with consequent loss of volume and deterioration of acoustical properties.

It is another desirable property of acoustical plaster mixes that they dry and set rapidly. A disadvantage of bentonite bound mixes such as those of the aforesaid Patent No. 1,927,102 is that they are slow in drying. For example, several days, even a week or ten days, may be required for a plaster of this character to dry sufficiently to allow application of a finish coat.

It has also been proposed to entrain air in plaster mixes by including an animal glue. Animal glue will entrain air in the form of bubbles. Upon drying and setting, these bubbles form cavities which are effective sound absorbers. However, animal glue leaves very objectionable odors. Also, the bubbles formed with animal glue have weak film strength, hence break down when sprayed.

It is a further desirable attribute of acoustical plaster mixes that the mix, when applied to a nonabsorbent surface such as ordinary sand plaster, should adhere tenaciously; that it should not shrink greatly on drying or setting; and that it should set and harden within a relatively short time.

It is an object of the present invention to provide improved compositions of matter of the character described.

It is a further object of the invention to provide plaster mixes which are capable of application to walls, which set and dry quickly and which form a plaster having good acoustical properties.

It is a particular object of the present invention to form acoustical plaster mixes from lightweight porous aggregates, such as expanded vermiculite and expanded perlite, which entrain large quantities of air in the form of bubbles, which retain their bulk and air content notwithstanding passage under pressure through a long hose and a nozzle during spray application and which, when applied, form a firm bond to substructures such as nonacoustical plaster, which do not shrink excessively and lose volume upon drying, and which are capable of drying or setting quickly.

These and other objects of the invention will be apparent from the ensuing description and the appended claims.

I have found that a superior acoustical plaster can be prepared by employing a lightweight, porous mineral as the aggregate; and by employing a suitable combination of binder and an air entraining agent which will form bubbles to entrain air in the wet mix, such bubbles having the property of being stable during application but having also the property of breaking down after the plaster mix has been applied, thereby forming open, interconnected air cells which are efficient sound absorbers.

As stated the aggregate is a lightweight porous mineral aggregate. Preferably it is a mineral aggregate having a density not exceeding about 10 lbs. per cubic foot. Most advantageously it is expanded vermiculite or expanded perlite, both of which have densities not exceeding about 10 lbs. per cubic foot. Other lightweight, porous aggregates may be used, e.g., Haydite, pumice and lightweight slag.

I mix with the aggregate a suitable quantity of binder. Preferably the binder is bentonite or other suitable clay such as eyerite which swells when mixed with water, which on drying will shrink and will also serve as a binder, and which will impart a plastic quality to a wet mix adapting it to spray application. Bentonite (or other clay binder) may be the only binder used; or it may be present as the principal binder component but mixed with an hydraulic binder or setting agent (i.e., one which reacts chemically with water to set and harden), such as calcined gypsum or Portland cement; or it may be present as a minor ingredient (quantitatively), in admixture with an hydraulic binder. Bentonite (or other clay binder) may be omitted altogether in certain cases, as explained hereinafter.

As stated above, an air entraining agent is also used. Preferably a product known as saponified or neutralized Vinsol resin is employed as the air entraining agent. Vinsol resin is a product which is widely known, which has been known since prior to 1940 and which is known to be an extract of pinewood. In the form used in my present invention it is neutralized with caustic alkali, preferably caustic soda. It is produced as follows:

Pinewood is extracted with a hydrocarbon solvent such as benzene to form a preliminary extract consisting, after evaporation of the solvent, of a mixture of turpentine, pine oil, rosin, and the resin appropriate for use in practicing the present invention. The turpentine and the pine oil are removed from the mixture by distillation following which the remaining mixture is extracted with a preferential solvent, for example, a petroleum hydrocarbon such as petroleum ether or gasoline, which removes the rosin, leaving a dark colored resinous substance which, when freed from the excess solvent, forms the resin contemplated by the present invention. The method of producing this resin is fully described in the specification of U.S. Letters Patent No. 2,193,026, granted March 12, 1940. This resin is further characterized by a methoxy content of from 3% to 6%, a melting point by the drop method within the limits of about 115° C. to 125° C. and an acid number of about 100. The resin can be saponified by treatment with a solution of potassium hydroxide, for example, to produce a saponified resin solution in the manner more particularly described in the specification of U.S. Letters Patent No. 2,199,206, granted April 30, 1940.

The defined resin is known in the trade as "Vinsol" resin, which is a trademark of Hercules Powder Company, Wilmington, Delaware.

The resin employed in accordance with the present invention is the saponified or neutralized resin which may be either the sodium or potassium salt. Preferably the sodium salt is used.

As stated the binder preferably contains bentonite, it being understood that, wherever bentonite is referred to, other similar clay material may be used. The bentonite may be used alone, or with an hydraulic setting agent or binder. If bentonite and an hydraulic binder are employed together, either may predominate in amount. The hydraulic binder has the advantage of a quicker set because it sets with water whereas bentonite requires drying by evaporation. Also, bentonite shrinks greatly on drying and an hydraulic setting agent has the advantage of reducing shrinkage. At the opposite extreme of 100% bentonite, a binder may be used which is 100% hydraulic setting agent, provided certain precautions are observed as explained hereinafter.

The preferred hydraulic setting agents are various forms of calcined gypsum such as gypsum plaster cement, casting plaster (which is a finer mesh calcined gypsum having a faster set than gypsum plaster cement); Trinity white cement (which is a white Portland cement) and ordinary Portland cement.

I am aware of the fact that expanded vermiculite and other lightweight porous aggregates have been previously mixed with saponified Vinsol resin and then mixed with Portland cement and water to provide a low density concrete; cf. Watts U.S. Patent No. 2,463,927. However, my present invention relates to an acoustical plaster rather than a low density concrete, and to this end the mixture is formulated to achieve, (1) the entrainment of air bubbles when mixed with water, (2) such bubbles being stable during application, but (3) in which the bubbles break during drying and hardening or setting of the plaster to create open air cells which interconnect rather than closed, noncommunicating cells. The latter (closed, noncommunicating cells) are of great value for thermal insulation, but for sound absorption it is important that the cells communicate or connect with one another. That is, in my composition, the cells are open such that one can actually blow air through a layer of the set and hardened plaster. A greatly enhanced acoustical quality results from this unique property.

To achieve this open-celled, intercommunicating cellular structure, I provide a means of breaking up the bubbles during or after the setting and hardening of the plaster. I can accomplish this in two ways, as follows:

Firstly, I take advantage of the fact that bentonite shrinks. On shrinking, I have found that bentonite breaks the bubbles. This does not occur until the wet mix has been applied and has begun to dry and the bentonite shrinks. That is, the bubbles are stabilized by the Vinsol resin and remain stable during application through a hose and nozzle and they break down only after application to form open, interconnected cells.

Secondly, if the proportion of bentonite is low, or if it is absent altogether, I compensate by adding to the mixture a surface active agent which will weaken the water film enclosing the bubbles. The preferred surface active agents are the alkali metal alkyl sulfates, such as sodium lauryl sulfate; also alkyl aryl sulfonates. These and other suitable surface active agents are available on the market under the trademarks Duponol, Orvus, Oronite, Nacconol and Santomerse, etc. Duponol is a trademark of E. I. du Pont de Nemours Co., of Wilmington, Delaware, for a series of surface active agents in which the active ingredient is sodium lauryl sulfate. I prefer to use Duponol WA Dry which consists of beads containing about 44–50% Na lauryl sulfate, or Duponol WAQ which is a viscous liquid containing about 30% Na lauryl sulfate. Orvus is a trademark of Procter & Gamble of Cincinnati, Ohio, for a series of surface active agents; Orvus AB containing 40% of an alkyl aryl sulfonate as the active ingredient, and Orvus WA containing sodium lauryl sulfate as the active ingredient. Nacconol is a trademark of the National Aniline Division, Allied Chemical & Dye Corp., New York, N.Y., for alkyl aryl sulfonates which are described in Schwartz and Perry, "Surface Active Agents," 1949, page 122. Oronite is a trademark of Oronite Chemical Co., San Francisco, California, for alkyl aryl sulfonates made by the method of Lewis U.S. Patent No. 2,477,383, e.g., by the method described in column 25, lines 6 to 31 of that patent.

The above trademark designations are provided for the convenience of those skilled in the art, because the most economical forms of surface active agent for my purpose are commercial mixtures whose precise compositions are unknown but which are entirely suitable for my purposes and are the most convenient to obtain in commercial quantities. If one wishes, pure compounds such as pure sodium lauryl sulfate

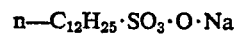

or pure sodium ortho-n-lauryl benzene sulfonate

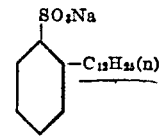

may be used. The above pure compounds whose formulae are set forth are operative but, of course, are much more expensive than commercial mixtures.

The following examples will serve further to illustrate the practice and advantages of my invention.

*Example 1.—High bentonite, low gypsum composition*

To provide a relatively "soft" acoustical plaster, I may employ expanded vermiculite, bentonite, gypsum plaster cement and a neutralized petroleum hydrocarbon insoluble pinewood resin (sodium salt), in the following approximate proportions:

| | | |
|---|---|---|
| Expanded vermiculite | cu. ft. | 65 |
| Bentonite | lbs. | 50–100 |
| Gypsum plaster cement | lbs. | 200–300 |
| Sodium salt of petroleum hydrocarbon insoluble pinewood resin (e.g., Na salt of Vinsol resin) | lbs. | 6–10 |
| Asbestos | lbs. | 50 |

In the above formula, any of various grades of expanded vermiculite may be used, e.g., No. 2, No. 3 or No. 4. By way of illustration, No. 2 and No. 3 grades have the following size distributions:

| Size | No. 2 | No. 3 |
|---|---|---|
| | Percent | Percent |
| −8+10 | 2 | |
| −10+20 | 8 | 12 |
| −20+30 | 68 | 17 |
| −30+40 | 15 | 22 |
| −40+70 | 4 | 10 |
| −70+100 | 1 | 32 |
| −100 | 2 | 7 |

The gypsum plaster cement is used in quantity sufficient to compensate for shrinkage of the bentonite on drying, and to accelerate the setting. It is not used in quantity sufficient to act as a major binder. Cf. Example 2, where a much greater quantity of gypsum plaster cement is used. The asbestos improves acoustical properties.

In the above formula, the addition of surface active agent is not necessary. The bentonite is sufficient to break the bubbles formed on mixing tht formula with water. However, it may be advantageous to add a small quantity of sodium lauryl sulfate to decrease the bubble strength. Another advantage of adding a bubble-weakening surface active agent is that it forms small as well as larger bubbles which break on drying to produce small as well as large cavities. Thus a greater assortment of cavities and more efficient sound absorption result.

In mixing the formula of Example 1, I preferably add the major portion, but not all of the water required for a suitable wet mortar, e.g., 80%; I mix this portion of water with the dry ingredients to form bubbles; and I then add the remainder of water so that the mix is freely plastic, will pass through a hose and will be amenable to "darbying," i.e., to smoothing out and trowelling.

*Example 2.—High gypsum composition*

To provide a relatively "hard" acoustical plaster, I may employ the following formula:

| | | |
|---|---|---|
| Expanded vermiculite (No. 2 or 3) | cu. ft. | 65 |
| Gypsum plaster cement | lbs. | 800 |
| Casting plaster | lbs. | 300 |
| Sodium salt of petroleum hydrocarbon insoluble pinewood resin (e.g., Na salt of Vinsol resin) | lbs. | 6–10 |
| Sodium lauryl sulfate | lbs. | ¹1½–3 |
| Asbestos | lbs. | 50 |

¹ Instead of 1½–3 lbs. of pure Na lauryl sulfate, about twice as much Duponol WA Dry may be used.

As will be seen, relatively soft acoustical plaster is made from a mix which is predominantly bentonite bound (Example 1) whereas relatively hard acoustical plaster is made from a mix which is predominantly bound by an hydraulic cement such as calcined gypsum (Example 2). However, I have found that it is advantageous to use a small quantity of hydraulic setting agent (e.g., gypsum plaster cement) in bentonite bound mixes and to use a small quantity of bentonite in mixes which are bound by an hydraulic cement. In the former case (bentonite bound mixes), the added hydraulic setting agent reduces shrinkage, hastens hardening and imparts water resistance to the end product. In the latter case (mixes bound with hydraulic cement) the added bentonite improves acoustical properties by assisting in breaking the bubbles during setting of the mixture.

It will, therefore, be apparent that my preferred compositions are as follows:

| Component | Amount | |
|---|---|---|
| | "Soft" Plaster | "Hard" Plaster |
| Lightweight aggregate | 60–65 cu. ft. | 60–65 cu. ft. |
| Bentonite | 50–100# (predominant binder). | q. s. to cause bubble bursting. |
| Hydraulic cement (e.g., calcined gypsum). | q. s. to accelerate setting, reduce shrinkage and improve water proofness (e.g., 200–300#). | 500–1,200# (predominant binder). |
| Air entraining agent (e.g., Na Vinsol Resin). | q. s. to entrain air; e.g. 6–10#. | q. s. to entrain air; e.g. 6–10#. |
| Surface active agent | 0–2# (Presence optional but preferred). | 3–5#. |

It will, therefore, be apparent that a dry mixture of lightweight porous aggregate and binder has been provided which can be mixed with water to produce a plaster mix which dries by evaporation and/or sets hydraulically to form a plaster. The acoustical properties of the plaster are improved by incorporating air in the wet mix in the form of bubbles which break on drying or setting to produce open and interconnecting air cells which are efficient sound absorbers. The sodium salt of pinewood resin is preferred to form stable bubbles. These bubbles break when the wet mixture dries or sets, thereby forming open, interconnected cells. Surface active agents aid this phenomenon (bubble breaking and the formation of interconnecting cells), and by a proper balancing of factors such as the quantity of bentonite, the quantity of pinewood resin, and the quantity of surface active agent, the bubbles can be made sufficiently stable but not too stable. Also other properties can be controlled such as setting time, shrinkage, water resistance, hardness and acoustical properties.

I claim:

1. An acoustical plaster mix approximately as follows:

| | | |
|---|---|---|
| Lightweight aggregate having a density of less than 10 pounds per cu. ft. | cu. ft. | 60–65 |
| Water-swellable clay | pounds | 50–100 |
| Calcined gypsum | do | 200–300 |
| Alkali metal salt of petroleum hydrocarbon insoluble pinewood resin extract selected from the group consisting of sodium and potassium salts | pounds | 6–10 |

2. The mix of claim 1 wherein the lightweight aggregate is expanded vermiculite.

3. The acoustical plaster mix of claim 1 wherein the water-swellable clay is bentonite.

4. The acoustical plaster mix of claim 1 wherein the lightweight aggregate is expanded vermiculite and the water-swellable clay is bentonite.

References Cited in the file of this patent

UNITED STATES PATENTS

| | | |
|---|---|---|
| 1,830,253 | Bechtner | Nov. 3, 1931 |
| 2,382,561 | Gregory | Aug. 14, 1945 |
| 2,542,364 | Schenker et al. | Feb. 20, 1951 |